…

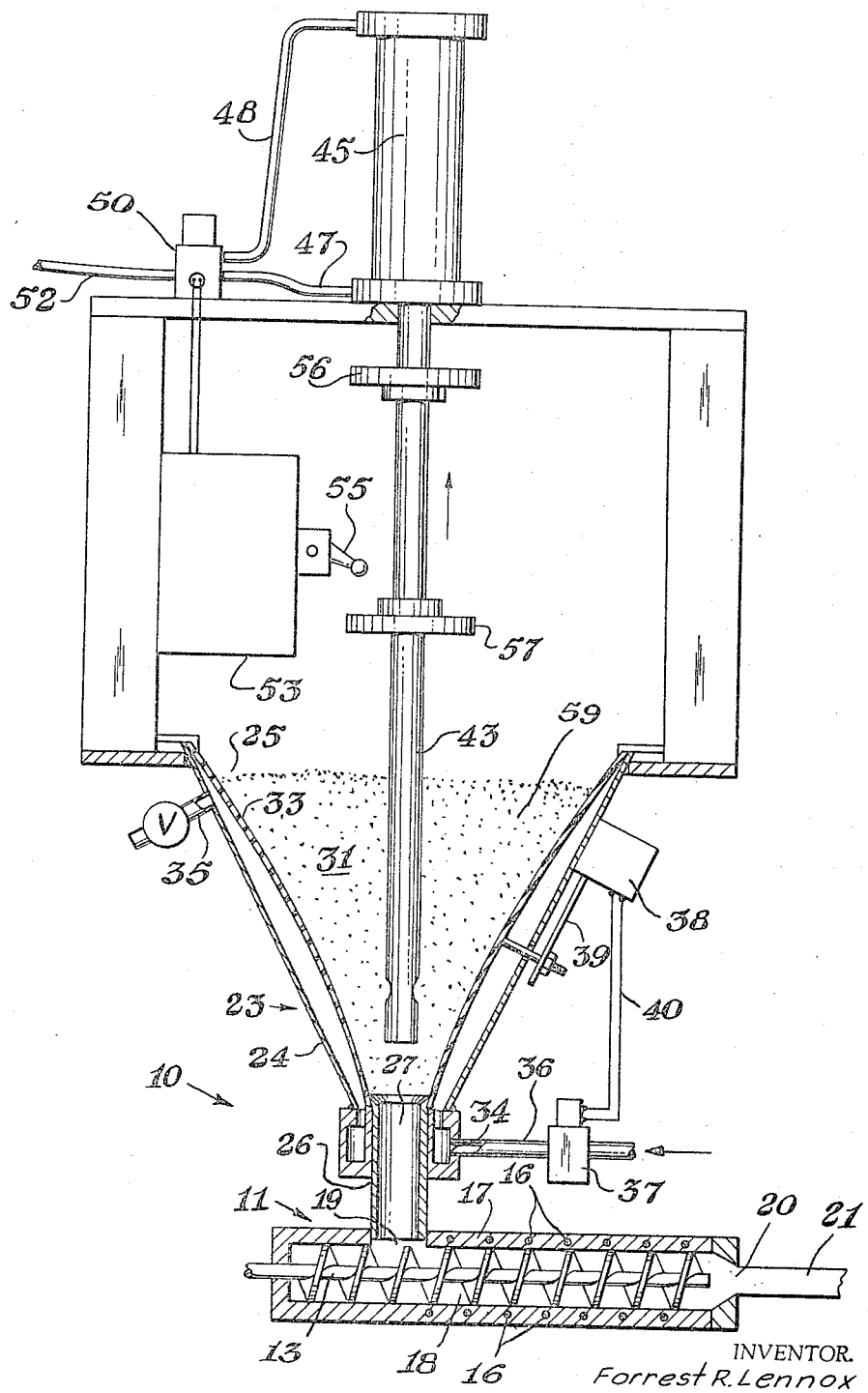

United States Patent Office 3,346,917
Patented Oct. 17, 1967

3,346,917
APPARATUS AND METHOD FOR SHAPING LOW DENSITY MATERIALS
Forrest R. Lennox, Coleman, Mich., assignor to The Dow Chemical Company, Midland, Mich., a corporation of Delaware
Filed Jan. 2, 1964, Ser. No. 335,091
4 Claims. (Cl. 18—12)

ABSTRACT OF THE DISCLOSURE

An apparatus is described which is particularly suited for feeding low density powders into heat fabricating apparatus. A tapered hopper is employed having a flexible wall that is cyclically flexed while a ram reciprocates within the hopper and cooperates with the flexible wall compacting and discharging the powder to a heat fabricating apparatus such as a screw extruder.

---

This invention relates to an apparatus for feeding and forming low bulk density materials. It more particularly relates to an apparatus for feeding and shaping of low bulk density thermoplastic resinous materials.

Certain thermoplastic resinous materials are prepared by polymerizing a monomeric material under conditions that result in the formation of a light, low bulk density fluffy powder which in many respects is similar to flour. Oftentimes it is desirable to mold or extrude such a powder into a finished article. However, in order to accomplish this in most conventional equipment, it is necessary to pre-compact the polymeric material into a form which can be readily handled. Oftentimes such light fluffy polymer has a density in the range of 8–15 pounds per cubic foot and must be pre-compacted to densities in the region of 25–30 pounds per cubic foot before a satisfactory operation is achieved. Without such pre-compaction, oftentimes the molded or extruded products show the presence of air bubbles and production rates are usually substantially lower than with predensified material.

It is an object of this invention to provide an improved apparatus for feeding low bulk density thermoplastic resinous materials such as polyolefins.

A further object of this invention is to provide an improved feeding hopper whereby light, fluffy materials of low bulk density are directly fed to an extrusion apparatus.

Another object of the invention is to provide an apparatus for the elimination of a separate pre-densifying step.

These benefits and other advantages in accordance with the present invention are readily achieved by feeding to a heat forming apparatus a low density light, fluffy thermoplastic resinous material to be formed by supplying to the feed port of the heat forming apparatus the material under a pressure of at least 20 pounds per square inch and pressing the material from at least two directions in a reciprocating manner.

The invention is most beneficially practiced utilizing the apparatus of the invention which comprises in cooperative combination a hopper having an inlet and an outlet end, said inlet end having an opening substantially greater in diameter than the outlet end, a passageway providing full communication between the inlet end and the outlet end and the passageway tapering to a smaller dimension adjacent the outlet end, a flexible wall disposed over at least a portion of the inner tapering wall of the passageway, the flexible wall adapted to be flexed inwardly, means to flex the wall, the means being controlled by the displacement of the wall, the means so constructed and arranged so as to force the wall inwardly when a pressure within the passage forces the wall outwardly, a ram adapted to reciprocally move to and fro within the passageway and force material into the outlet end and to enter the outlet end, the ram provided with means to reverse its travel on reaching predetermined positions within and without the outlet end.

Further features and advantages of the present invention will become more apparent when the following specification is taken in connection with the drawing wherein:

The figure represents a partly-in-section view of an apparatus in accordance with the invention generally designated by the reference numeral 10.

The apparatus 10 comprises a heat shaping apparatus or extruder 11 having a forwarding screw 13, a plurality of heating elements 16 disposed within the barrel 17 defining the cavity 18. The barrel 17 is provided with an inlet port 19 and a discharge port or die 20. A shaped article 21 is issuing from the die 20. A feeding assembly 23 is positioned in operative communication with the feed port 19. The feeding assembly 23 comprises a hopper 24 having an inlet end 25 and an outlet end 26. The outlet end 26 defines a generally cylindrically passageway 27. The hopper 24 defines a passageway 31 extending between the inlet end or opening 25 and the passageway 27. Thus the passageway 31 narrows from the inlet to outlet end. A major portion of the inner surface of the hopper 24 lying between the passageway 27 and the inlet end 25 is provided with a flexible deformable lining 33. The hopper 24 defines a fluid inlet 34 and a fluid outlet 35. Associated with the fluid inlet 34 is a fluid supply line 36 and a control means or valve 37. A lining position sensing device and control 38 is positioned adjacent the flexible hopper lining 33, an arm 39 contacts the lining 33, which in turn activates the valve 37 through the control line 40. A ram 43 is disposed generally coaxially with the passageway 27 and adapted to reciprocally extend into and be removed from the passageway. The ram 43 is operatively connected to the fluid operated positioning means 45. Operation of the positioning means 45 is achieved by means of a pressurized fluid entering through the lines 47 and 48 which are operatively connected to a valve 50. The valve 50 in turn is in operative association with a supply of pressurized fluid 52. Operatively connected to the valve 50 is a valve control 53. The valve control 53 in turn is controlled by the position of an operating lever 55 in operative association therewith. The operating lever 55 is positioned by means of the stops 56 and 57 on the ram 43. Disposed within the hopper 24 is a low density thermoplastic resinous material 59.

In operation of the apparatus of the invention as illustrated in the accompanying figure, in accordance with the method of the invention the materials to be fed to the heat forming apparatus 11 is placed within the hopper 24. Fluid pressure is applied to the valves 50 and 37. The controller 53 is connected in such a way that the valve 50 will force the actuator in one direction. For example, as illustrated in the figure, if the vertically disposed ram 43 is being withdrawn from the passageway 27, the stop 57 will contact the operating handle 55 causing the valve to change position and force the ram toward the passageway 27 causing the stop 56 to engage in lever 25 and reverse the direction of travel. Thus with no material in the hopper the ram will oscillate back and forth at a rate determined by the physical characteristics of the system. The pressure of the ram transmitted by the low density material in the hopper coupled, initially, with the action of the ram, causes the lining 33 to contact the actuating lever 39 causing the control 37 to admit fluid under pressure to the space between the hopper and the flexible lining causing the lining to move inwardly and compress the low density material 59 and remove the lining from the actuating arm 39 which operates the controller 38, in turn closing the valve 37. The fluid under pressure flows from the outlet port 35 and the flexible lining 33 approaches the hopper 24 actuating the lever 39, causing the flexible lining to pulsate. The pulsating hopper lining 33 in combination with the force of gravity and the ram 43 incrementally causes compression or densification of the material within the hopper 24. The oscillating ram 43 forces the partially densified material into the heat fabricating apparatus 10 at a rate not greater than its extrusion rate as the cycling rate of the ram 43 is selected to be high relative to the rate of travel of the ram toward the hopper when material is being fed. The upstroke, that is, movement of the ram in the direction of the arrow is relatively rapid compared to the rate of movement of the ram in the opposite direction. It is found that the rate for the ram 43 to complete a cycle relative to the pulsation of the hopper lining is usually in a ratio of from about 1:2 to about 1:100. Beneficially, for operation when feeding materials such as low bulk density polyolefins of the light and fluffy variety a hopper pulsation rate of from about 6 per minute to about 30 per minute with a ram oscillation rate of from 2 per minute to about 10 per minute is beneficial.

By way of further illustration a feeding assembly substantially as illustrated in the figure was operatively connected to a one-inch National Rubber Machinery extruder with front and rear heating zones and a forwarding type screw operating at 62 r.p.m. An air cylinder having a 4-inch travel was utilized to operate the ram which had a diameter of about one inch. Under identical conditions a quantity of polyethylene having a bulk density of 15.27 pounds per cubic foot was placed in the hopper and air at a pressure of 40 pounds per square inch was fed to the air cylinder operating the ram. The extruder pressure indicated 300 pounds per square inch. An extrusion rate of 7.69 pounds per hour was achieved with a hopper pulsation rate of about 10 cycles per minute. When the air pressure was raised to 50 pounds per square inch the extrusion rate increased to 7.77 pounds per hour. A second sample of polyolefin having a bulk density of 8.16 pounds per cubic foot was treated under similar conditions and with a ram air pressure of 60 pounds per square foot. A second sample of a polyolefin having a bulk density of 8.16 pounds per cubic foot was employed under substantially similar conditions, with an air pressure of 60 pounds per square inch the extrusion rate was about 7.56 pounds per hour. At 40 pounds per square inch the extrusion was 7.25 pounds per hour and at a pressure of 20 pounds per square inch the extrusion rate was 6.5 pounds per hour.

By way of comparison, with no air on the ram but the hopper pulsating an extrusion rate of 2.7 pounds per hour was achieved, and the extrusion contained air bubbles; with the ram operating and the hopper pulsating an extrusion rate of 3.3 pounds per hour is achieved. With neither ram nor pulsating hopper in use, extrusion was erratic and averaged about 1.2 pounds per hour. Without the ram or the pulsating hopper walls it was necessary to pellet the polyolefin material to a bulk density of about 24.7 pounds per cubic foot to attain an extrusion rate of 7.25 pounds per hour.

In a manner similar to the foregoing examples, other light fluffy thermoplastic resinous materials including polyvinyl chloride, polypropylene and the like, are readily extruded at high rates and little or no evidence of bubbles is observed.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus comprising in cooperative combination
a heat fabricating apparatus for the heat fabrication of thermoplastic resinous material, the heat fabricating apparatus having a feed port,
a feed hopper, the feed hopper having a passageway with an inlet end and an outlet end, the inlet end having an opening substantially greater in diameter than the outlet end, and
the passageway tapering to a smaller dimension adjacent the outlet end, the outlet end of the hopper being in operative connection with the feed port of the heat fabricating apparatus,
a flexible wall disposed over at least a portion of the inner tapering wall of the passageway,
the flexible wall adapted to be flexed inwardly,
means to flex the wall,
the means to flex the wall being controlled by the displacement of the wall, the means being so constructed and arranged so as to force the wall inwardly when a pressure within the passage forces the wall outwardly,
a ram adapted to reciprocally move to and fro within the passage and force material into the outlet end and to enter the outlet end,
the ram provided with means to reverse its travel on reaching predetermined positions within and without the outlet end thereby adapted to force a particulate material disposed between the hopper into the feed port.

2. An apparatus comprising in cooperative combination
an extruder for the heat fabrication of thermoplastic resinous material, the extruder having a feed port,
a feed hopper, the feed hopper having a passageway with an inlet end and an outlet end, the inlet end having an opening substantially greater in diameter than the outlet end, and
the passageway tapering to a smaller dimension adjacent the outlet end, the outlet end of the hopper being in operative connection with the feed port of the heat fabricating apparatus,
a flexible wall disposed over a major portion of the inner tapering wall of the passageway,
the flexible wall adapted to be flexed inwardly, by a means of a gas under pressure forced into and discharged from a cavity adjacent the flexible wall,
the gas to flex the wall being controlled by the displacement of the wall from the hopper,
the means being so constructed and arranged so as to force the wall inwardly when a pressure within the passage forces the wall outwardly,
a ram adapted to reciprocally move to and fro within the passage and force material into the outlet end and to enter the outlet end, the ram provided with means to reverse its travel on reaching predetermined positions within and without the outlet end.

3. An apparatus particularly suited for the processing of a low bulk density thermoplastic resinous material comprising in cooperative combination
a heat fabricating apparatus having an inlet or feed port,
a hopper in association with the feed port adapted to deliver a particulate thermoplastic material to the feed port,
the hopper defining a passageway extending between the inlet and the outlet end of the hopper,
the passageway having a tapering configuration, the configuration having a major cross sectional area remote from the heat fabricating apparatus and a minor cross sectional area adjacent the heat fabricating apparatus,
a conduit of generally constant cross section extending between the outlet end of the hopper adjacent the heat fabricating machine and the feed port thereof,
a flexible deformable lining disposed over at least a major portion of the inner wall of the tapering portion of the hopper,
at least one passageway within the wall of the hopper adjacent the flexible lining adapted to permit entry or discharge of a fluid to a location between the flexible lining and the inner hopper wall,
a control actuator positioned adjacent the inner hopper wall and adapted to engage the surface of the flexible lining adjacent the inner hopper wall, when the flexible lining is close to the inner hopper wall,
the actuator in association with a control means adapted to provide fluid under pressure between the inner hopper wall and the lining thereby forcing the lining away from the actuator,
a reciprocating ram positioned within the hopper and adapted to move to and fro generally along the axis of the conduit of constant cross section and to enter and be retracted from the conduit of constant cross section adjacent the lower end of the hopper,
the ram being adapted to travel into the conduit of constant cross section at a rate dependent on the removal of material therefrom and to be retracted from its extreme position adjacent the feed port of the heat fabricating machine, and
means provided to reverse the direction of travel of the ram when the ram reaches a predetermined travel in either direction.

4. An apparatus particularly suited for the processing of a low bulk density thermoplastic resinous material comprising in cooperative combination
a heat fabricating apparatus having an inlet or feed port,
a hopper in association with the feed port adapted to deliver a particulate thermoplastic material to the feed port,
the hopper defining a passageway extending between the inlet end and the outlet end of the hopper, the passageway having a tapering configuration, the configuration having a major cross sectional area remote from the heat fabricating apparatus and a minor cross sectional area adjacent the heat fabricating machine, and
a conduit of generally constant cross section extending between the terminal portion of the hopper adjacent the heat fabricating machine and the feed port thereof,
at least a major portion of the inner wall of the tapering portion of the hopper having disposed thereon a flexible deformable lining,
at least one passageway within the wall of the hopper adjacent the flexible lining adapted to permit entry of a fluid to a location between the flexible lining and the inner hopper wall,
a passageway through the hopper wall to discharge the fluid,
a control actuator positioned adjacent the inner hopper wall and adapted to engage the surface of the flexible lining adjacent the inner hopper wall, when the flexible lining is close to the inner hopper wall, the actuator in association with a control means adapted to provide fluid between the inner hopper wall and the lining thereby forcing the lining away from the actuator, when the fluid is being provided at a rate greater than the rate at which it can pass from the discharge passageway,
a reciprocating ram positioned within the hopper and adapted to move to and fro generally along the axis of the conduit of constant cross section and to enter and be retracted from the conduit of constant cross section adjacent the lower end of the hopper,
the ram being adapted to travel into the conduit of constant cross section at a rate dependent on the removal of material therefrom by the feed port and to be retracted from its extreme position adjacent the feed port of the heat fabricating machine and to provide a force toward the feed port at a rate sufficiently rapidly that adequate feed of material to the heat fabricating machine is maintained, and
means provided to reverse the direction of travel of the ram when the ram reaches a predetermined travel in either direction.

References Cited
UNITED STATES PATENTS

| | | |
|---|---|---|
| 2,369,359 | 2/1945 | McWilliam et al. |
| 2,646,905 | 7/1953 | Vincent _____ 222—203 X |
| 2,732,099 | 1/1956 | Davis _____ 222—203 X |
| 2,792,262 | 5/1957 | Hathorn. |
| 2,933,175 | 4/1960 | Gray _____ 18—12 X |
| 3,047,034 | 7/1962 | Sassmannshausen et al. |

WILLIAM J. STEPHENSON, *Primary Examiner.*